Dec. 28, 1965
F. M. SHOEMAKER
3,226,634
TRANSISTORIZED METAL DETECTOR WITH
TEMPERATURE COMPENSATION MEANS
Filed March 23, 1961
2 Sheets-Sheet 1
Fig. 2
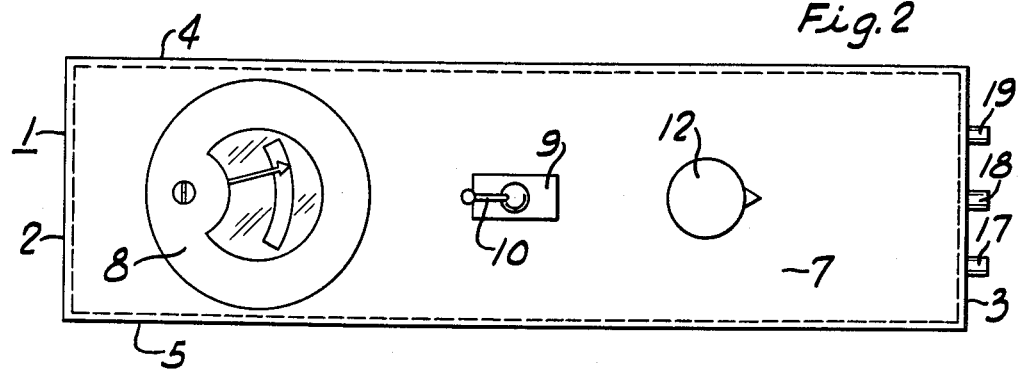
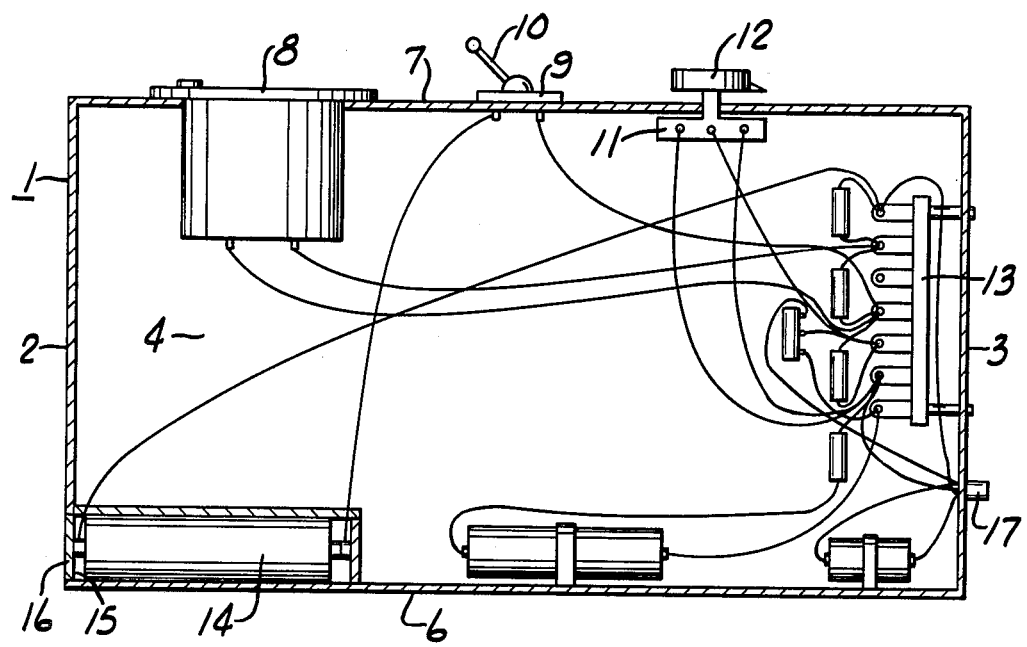
Fig. 1
INVENTOR.
FRANK M. SHOEMAKER
BY
William D. Carothers
HIS ATTORNEY Dec. 28, 1965  F. M. SHOEMAKER  3,226,634
TRANSISTORIZED METAL DETECTOR WITH
TEMPERATURE COMPENSATION MEANS
Filed March 23, 1961  2 Sheets-Sheet 2
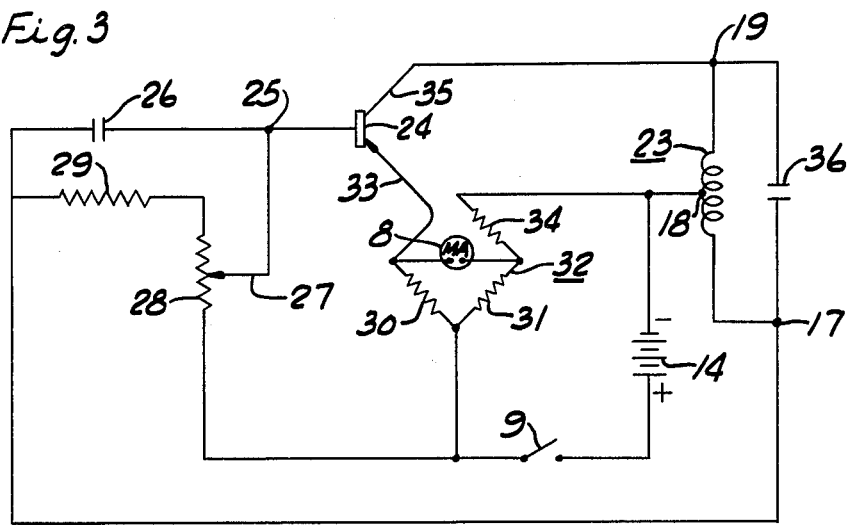
Fig. 3
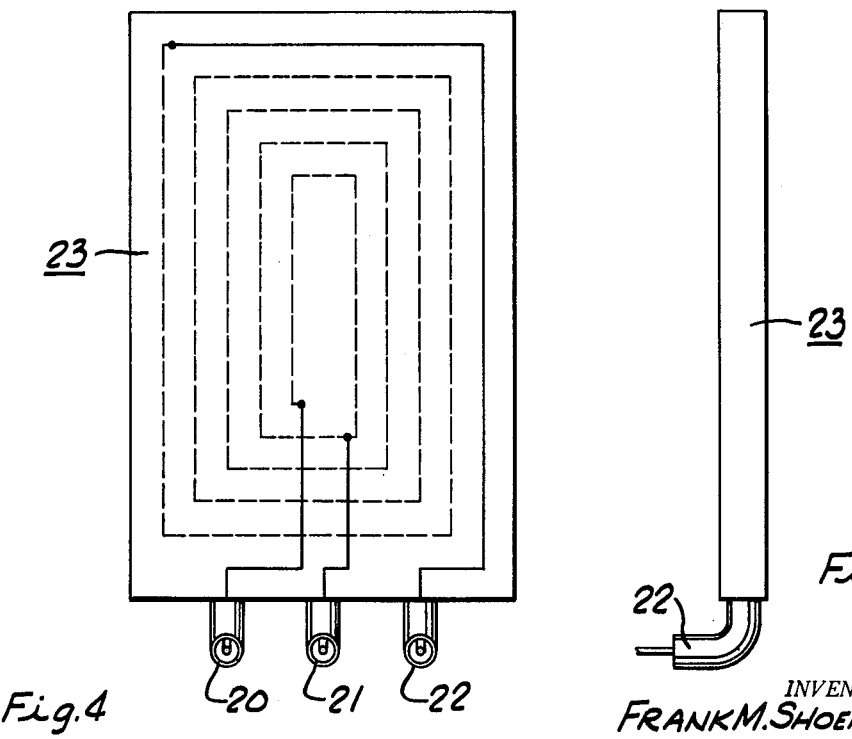
Fig. 4
Fig. 5
INVENTOR.
FRANK M. SHOEMAKER
BY
*William H. Carothers*
HIS ATTORNEY United States Patent Office 3,226,634
Patented Dec. 28, 1965

3,226,634
TRANSISTORIZED METAL DETECTOR WITH
TEMPERATURE COMPENSATION MEANS
Frank M. Shoemaker, 2560 Noblestown Road,
Pittsburgh, Pa.
Filed Mar. 23, 1961, Ser. No. 97,870
5 Claims. (Cl. 324—41)

This invention relates generally to detecting metallic objects and more particularly to the method and apparatus for detecting metals in building construction.

In the construction of buildings, homes and other similar types of construction many metallic materials, such as metal beams, pipes, conduits and electrical outlets, are placed in the walls, ceilings and floors of these structures. After the walls, ceilings and floors have been constructed and covered by cement or plaster or other wall coverings, these metallic objects are hidden from view.

Frequently an occasion arises when there is a necessity to locate such metallic objects. Referring to the plans or drawings of the structure will aid in determining approximately where the metallic object or material is located in the wall or ceiling. The placing of metallic materials and other objects within the structure or buildings and homes in the exact location as shown on the plans is well known not to be complied with. Therefore a part of such structure is unnecessarily destroyed in an attempt to find such metal parts. The present invention is to eliminate this waste and also make an improvement over Letters Patent No. 2,550,607.

The main object of this invention is the provision of a lightweight portable device for detecting metal objects and materials at their exact location within a wall.

Another object is a new and improved circuit with compensating means for atmospheric conditions and tuning the circuit when detecting metallic materials within a wall or similar structures.

Another object is the provision of a transistor to provide greater dependability and endurance and eliminate warm-up periods which are necessary with vacuum tubes and also eliminate the necessity of a greater battery potential necessary with vacuum tubes for power and filament voltage, thereby making the detecting device lighter.

Other objects and advantages appear hereinafter in the following description and claims.

The accompanying drawings show for the purpose of exemplification without limiting this invention or the claims thereto, certain practical embodiments illustrating the principles of this invention wherein:

FIG. 1 is a view in section showing the apparatus of this invention.

FIG. 2 is a plan view of the structure shown in FIG. 1.

FIG. 3 is a circuit diagram employing a transistor atmospheric compensating means and a three-legged resistance bridge.

FIG. 4 is a pickup coil for the employed circuit.

FIG. 5 is an end view of the pickup coil in FIG. 4.

Referring to the drawings, FIGS. 1 and 2 show the detecting device in a suitable case or box 1 made up of end walls 2 and 3, back wall 4 and front wall 5, and a bottom 6. The top contains three holes in which a milliammeter 8, a single pole switch 9 with a switch lever 10, and variable resistance 11 with a control knob 12 are supported and fixed thereto.

Inside the case 1 the circuit employed for detecting metallic material is placed in a suitable manner. FIG. 1 shows one of the many suitable plans. A strip 13 is used for easy connection of the different electrical components making up the circuit.

Battery 14 is used for the power supply. End wall 2 contains an opening 15 for the battery 14 to be placed in the case 1. After the battery has been placed in position, a threaded cap 16 is positioned in the opening 15 which is tapped, making it suitable for receiving the cap 16.

The end wall 3 contains three female terminals 17, 18 and 19 for receiving respectively the male terminals 20, 21 and 22 of the pickup coil 23 shown in FIG. 4.

FIG. 3 shows a circuit diagram of the detection circuit comprising this invention. The transistor 24 has its base 25 connected to a ceramic condenser 26 and the control arm 27 of the variable resistance 28. The condenser 26 is temperature responsive to compensate for the transistor characteristic changes in cold weatther. One end of a variable resistance 28 is connected to the resistance 29 which in turn is connected to the other side of the condenser 26 and also to one of the terminals 17 of the pickup coil 23. The variable resistance 28 can be varied to balance the circuit especially in hot weather operation. Also the variable resistance 28 is varied to zero the milliammeter 8.

The other end of the variable resistance 28 is connected to the switch 9, the resistance 30, and the resistance 31 of the three-legged resistance bridge 32. The other end of the resistance 30 is in turn connected to the emitter 33 of the transistor 24. The other end of the resistance 31 is connected to the resistance 34 the other end of which is connected to the negative terminal of the battery 14 and the tap terminal 18 of the pickup coil 23. The positive terminal of battery 14 is connected to one side of the switch 9.

The collector 35 is connected to the pickup coil 23 at the terminal 19. A condenser 36 is placed across the terminals 17 and 19 of the pickup coil 23. This condenser provides the necessary capacitance for a tuned circuit with the inductance of the pickup coil 23.

The milliammeter 8 is connected across the three-legged bridge 32, one lead connected between the emitter 33 and the resistance 30 and the other milliammeter lead is connected between the resistance 31 and the resistance 34.

After the switch 9 is turned on the circuit is ready for use as there is no need to wait for any electronic tubes to warm up. The condenser 36 being properly selected to provide a tuned circuit adjusts itself to operate properly with the transistor 24. If the detecting device is being used in cold weather the variable resistance may be varied to balance the milliammeter. In other words, by varying the variable resistance 28 the current through the milliammeter is made to be zero by changing the bias current on the transistor to balance the flow of current through the legs of the three-legged bridge 32. Of course the adjustment being made to the milliammeter is done with the pickup coil 23 connected to the circuit at terminals 17, 18 and 19. FIG. 4 shows a rectangular type of pickup coil. However other desired sizes and shapes may be employed, the shape depending upon the object being located within the walls or ceiling. The pickup coils should take the form and dimension similar to the metallic object within the wall in order to provide for a maximum coupling between the metallic object or material and the pickup coil.

An example of a use of this detecting device would be the finding of the exact location of a rectangular outlet box embedded in the plaster of a wall or other such similar material. In such case a rectangular pickup coil would be used with the detecting circuit. The detector is moved along the wall with the pickup coil substantially in the same physical plane as the outlet box which would most probably be the same physical plane that the wall is, which is a vertical position. As the detecting device comes within the proximity of the outlet box the meter will immediately register a positive battery current flowing due to an unbalanced bridge which is caused by the decreased impedance of the pickup coil to the flow of this current to the transistor. This current flow unbalances the bridge circuit. A slight movement of the detecting device in any direction will cause the current reading to decrease since the impedance of the tank circuit increases. The operator can move the detector around the vicinity of the outlet box until he finds the exact location where the meter reads the highest current therefore showing the maximum coupling between the pickup coil and the metallic material, or in the case here the outlet box. Then with a pencil or other suitable marking material an outline of the pickup coil may be drawn on the wall showing the exact location of the outlet box. This accessory of the location is made more exact if the dimensions of the pickup coil are substantially the same as the dimensions of the outlet box within the wall. After locating the outlet box only a small portion of a wall will have to be taken out, that portion being the size of the outlet box. Therefore the destroying of a larger portion of a wall in trying to locate the outlet box is eliminated and the expense of repairing a larger portion of the wall is also eliminated.

Locating circular or hexagonal shaped outlet boxes may be made with pickup coils of substantially the same shape as the object being searched. However it may be difficult to have so many types of pickup coils made for each different shape of outlet boxes or other metallic objects placed within a wall. Therefore many times it will be necessary to use a pickup coil which does not have a shape similar to the object being located. This makes it difficult to find the exact center of the object because of the difference in size and dimension of the pickup coil or other metallic material being hunted within a wall or ceiling. The milliammeter will not register a current reading as high as would be expected when the pickup coil and the metallic object being hunted are of the same relative dimention and size. Due to a lower current reading it may be a little difficult to find the exact location. The exact location may be found within a substantial degree of accuracy. Also in such cases the operator should observe and make sure that his milliammeter is perfectly adjusted for a zero reading before using the detector. Also the detector should be placed as close to the surface of the wall as possible, thereby increasing the coupling between the metallic object or material and the pickup coil.

I claim:

1. A device for detecting metallic objects comprising an oscillator made up of transistor means, a pickup coil having an intermediate tap, a condenser connected in multiple with the extremities of said pickup coil to form an oscillator tank circuit, the collector of said transistor means connected to one extremity of said pickup coil, a second condenser connected between the base of said transistor means and the other extremity of said pickup coil, a resistance having one end connected to said other extremity of said pickup coil and having an other end, a second resistor having one end connected to said other end of said first resistance and having an other end, a connection from the base of said transistor means to an intermediate portion of said second resistor, a three-legged resistance bridge, a first leg being connected between said other end of said second resistance and the emitter of said transistor means, the second and third legs being connected in series and one end of the second leg of which is connected to said other end of said second resistance means and the other end of said third leg which is connected to said intermediate tap, battery means having the negative terminal connected to said intermediate tap, switch means having one contact connected to said other end of said second resistance, the positive end of said battery means being connected to the other contact of said switch means, a meter connected on one side to said emitter and on the other side to a position between said second and third legs of said three-legged bridge.

2. The structure of claim 1 characterized in that the connection to the intermediate portion of said second resistance being variable to change the transistor bias to balance said meter reading and to compensate for ambient temperatures subjected to said transistor means during the different temperatures.

3. The structure of claim 1 characterized in that said second condenser is responsive to ambient temperature to compensate for changes in the ambient temperature subjected to said transistor means and maintain a balance in said bridge circuit.

4. The structure of claim 1 characterized by a metallic object closely coupled with said pickup coil to unbalance said bridge circuit and show a current flowing through said meter means.

5. The structure of claim 1 characterized in that said pickup coil is interchangeable with other pickup coils in order to make the dimension of said pickup coil substantially correspond with those of the metallic object being located providing a maximum inductance coupling between said pickup coil and said metallic object being located within a hidden surface to materially reduce the impedance of the tank circiut to increase the direct current flow through the meter.

References Cited by the Examiner

UNITED STATES PATENTS

| 2,483,070 | 9/1949 | Spindler | 317—248 |
| 2,550,607 | 4/1951 | Shoemaker | 324—41 |

FOREIGN PATENTS

| 478,529 | 11/1951 | Canada. |
| 1,168,757 | 9/1958 | France. |

OTHER REFERENCES

Gray, V. N.: Frequency Stabilization of Oscillators, May 1956, pages 219–220, Wireless World.

WALTER L. CARLSON, *Primary Examiner*.